(12) United States Patent
Fluhler et al.

(10) Patent No.: US 10,145,660 B1
(45) Date of Patent: Dec. 4, 2018

(54) LAND MINE DETECTION SYSTEM

(71) Applicants: Herbert U. Fluhler, Huntsville, AL (US); Michael J. Guthrie, Madison, AL (US)

(72) Inventors: Herbert U. Fluhler, Huntsville, AL (US); Michael J. Guthrie, Madison, AL (US)

(*) Notice: Subject to any disclaimer, the term of this patent is extended or adjusted under 35 U.S.C. 154(b) by 346 days.

(21) Appl. No.: 14/945,421

(22) Filed: Nov. 18, 2015

Related U.S. Application Data

(60) Provisional application No. 62/081,201, filed on Nov. 18, 2014.

(51) Int. Cl.
*G01S 13/88* (2006.01)
*F41H 11/136* (2011.01)
*G01V 3/08* (2006.01)

(52) U.S. Cl.
CPC .......... *F41H 11/136* (2013.01); *G01S 13/885* (2013.01); *G01V 3/08* (2013.01)

(58) Field of Classification Search
CPC ...... G01S 13/88; G01S 13/885; G01S 13/887; G01V 3/12
USPC .......................................................... 342/22
See application file for complete search history.

(56) References Cited

U.S. PATENT DOCUMENTS

| | | | | |
|---|---|---|---|---|
| 5,680,048 A * | 10/1997 | Wollny | .................. | F41H 11/12 324/329 |
| 6,026,135 A * | 2/2000 | McFee | .................. | C09D 11/00 250/392 |
| 6,600,441 B2 * | 7/2003 | Liedtke | .................. | B25F 5/00 342/175 |
| 6,999,021 B2 * | 2/2006 | Taylor, Jr. | .............. | G01S 13/89 342/191 |
| 7,170,440 B1 * | 1/2007 | Beckner | .................. | G01S 7/024 342/118 |
| 7,333,045 B1 * | 2/2008 | Aomori | .................. | G01S 13/88 342/175 |
| 8,310,236 B2 * | 11/2012 | Duvoisin, III | ......... | G01V 3/104 324/326 |
| 8,854,247 B2 * | 10/2014 | Etebari | .................... | G01V 3/12 324/323 |
| 9,207,307 B2 * | 12/2015 | Stolarczyk | ............... | G01V 3/12 |
| 9,335,407 B2 * | 5/2016 | Bowring | ................. | G01S 7/024 |

(Continued)

*Primary Examiner* — Peter M Bythrow
(74) *Attorney, Agent, or Firm* — Patent Grove LLC; Tomas Friend

(57) ABSTRACT

The present invention discloses a dual-technology sensor head tightly integrating an Electromagnetic Induction (EI) sensor coil for detection, localization and discrimination of metal in mines and Improvised Explosive Devises (IED), and a dual polarized Ultra-Wideband (UWB) radar antenna array for Ground Penetrating Radar for detection, localization and discrimination of same. The core challenge addressed is how to prevent the EI sensor from detecting the metal in the UWB antenna which then desensitizes the EI sensor and degrades its dynamic range. The key characteristic of the new UWB radar antenna design is its very low magnetic induction, thereby imposing very little degradation to the EI coil. Additionally, the UWB antenna array incorporates unique design features to enhances its low frequency performance for better penetration of the ground. Through the design guidelines taught herein the EI sensor has been demonstrated to incur no degradation from the proximate UWB array.

17 Claims, 15 Drawing Sheets

(56) References Cited

U.S. PATENT DOCUMENTS

| | | | |
|---|---|---|---|
| 2006/0284758 A1* | 12/2006 | Stilwell | G01S 13/888 342/22 |
| 2010/0085234 A1* | 4/2010 | Steinway | G01S 13/888 342/22 |
| 2010/0277358 A1* | 11/2010 | Duvoisin, III | G01D 1/00 342/22 |
| 2010/0277397 A1* | 11/2010 | Scott | G01D 1/00 343/904 |
| 2012/0092206 A1* | 4/2012 | Etebari | G01V 3/12 342/22 |
| 2012/0262324 A1* | 10/2012 | Samaniego | G01S 13/885 342/22 |
| 2013/0071213 A1* | 3/2013 | Allouche | E02F 9/245 414/685 |
| 2013/0082865 A1* | 4/2013 | Duvoisin, III | H01Q 1/273 342/22 |
| 2014/0022106 A1* | 1/2014 | Duvoisin | G01S 13/885 342/22 |
| 2014/0125509 A1* | 5/2014 | Stolarczyk | G01S 7/35 342/22 |
| 2014/0226850 A1* | 8/2014 | Beer | G06T 11/003 382/103 |
| 2016/0061948 A1* | 3/2016 | Ton | G01S 13/885 342/22 |

* cited by examiner

LAND MINE DETECTION SYSTEM

CROSS REFERENCE TO RELATED APPLICATION

This application claims the benefit of Applicant's provisional application No. 62/081,443, filed Nov. 18, 2014, and which is incorporated in its entirety by reference herein.

STATEMENT REGARDING FEDERALLY FUNDED DEVELOPMENT

This invention was made with Federal Government support under contract no. W909MY-12-C-0030 awarded by U.S. Army Contracting Command. The Government has certain rights in the invention.

FIELD OF THE INVENTION

This application relates generally to the field of detection of mines and IEDs, as well as the detection of underground utilities and other objects of interest such as from geological and archeological surveys. More particularly, a metal detector sensor is combined with ground penetrating radar in order to obtain benefits of each in a single sensor unit.

BACKGROUND OF THE INVENTION

The advent of global terrorism has captured world attention for the detection, location and discrimination of mines and Improvised Explosive Devices (IEDs). Detecting these threats is very challenging, and thus far research has not revealed one phenomenon or "silver bullet" which can reliably provide the needed capability against these threats. Instead, the best approach currently appears to be a melding or integration of several technologies in order to better the performance over any one technology.

Metal detectors, more technically referred to as Electromagnetic Induction (EI) sensors can detect the metal in mines and IEDs. It is very effective against some mines and less so against newer "low metal" mines. Ground Penetrating Radar (GPR) can provide good capability to indicate the presence of an object under ground but may lack good discrimination performance against rocks and similar underground artifacts. If one were to combine EI sensing with GPR sensing the two would complement each other with a net overall improvement in capability against many mines and IEDs.

However, there is a problem with using both these technologies together. Invariably one does not want a multiplicity of sensor heads for both practical reasons plus co-registration reasons. Further, if such detectors are to be borne by soldiers, they must be simple and light weight which suggests that that the sensor must be one unit even if it uses multiple technologies. This suggests that the sensor heads need to be melded into one light weight holistic unit, and not a multiplicity of different separate units.

A problem presents when trying to combining the sensor head of an EI sensor with that of a GPR sensor in that GPR requires metallic antennas to operate, and at the same time, any such metallic antenna, if closely integrated with an EI sensor will necessarily place the metallic antenna in close proximity to the EI sensor coil. This will tend to saturate the EI sensor and at least degrade its sensitivity and dynamic range and possibly make it ineffective. The reason for this is obvious in that an EI sensor is designed to detect metal and if the GPR antenna is made of metal and placed close to the EI coil, it almost cannot help but detect the GPR antenna metal. The resulting degradation in EI performance takes away from the otherwise highly desirable synergism between these two sensors, thereby negating a significant amount of the motivation for combining them. The objective of this invention is to remove that limitation and to enable the EI sensor to realize its full performance capability in the proximate presence of a GPR antenna.

DETAILED DESCRIPTION OF THE DRAWINGS

Figure 1:
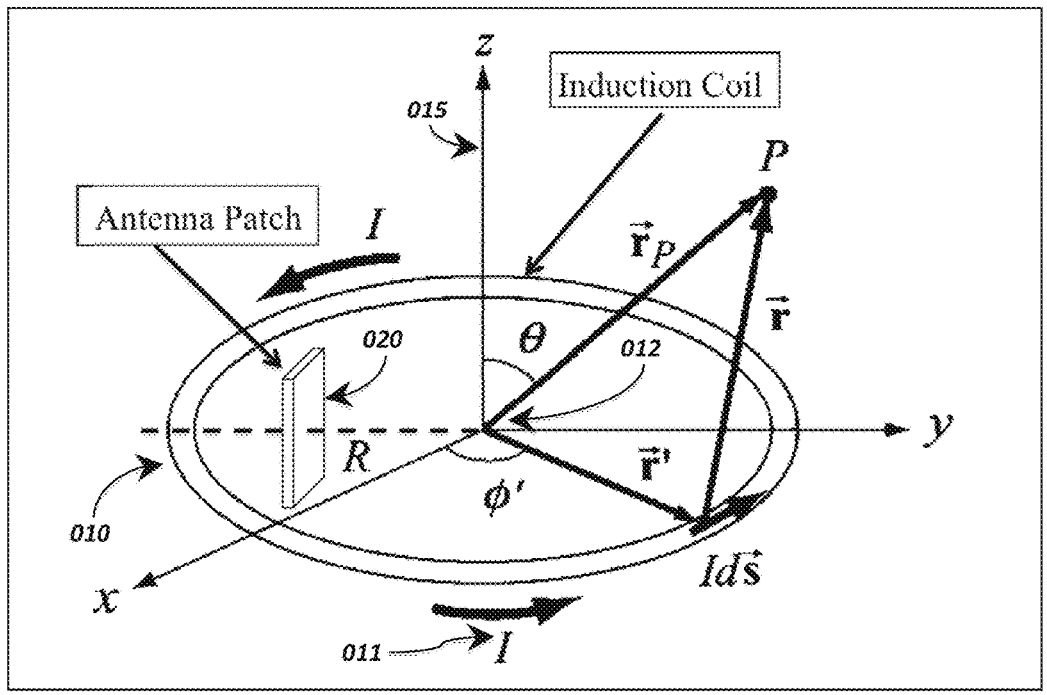
FIG. 1 is an illustration of the current in an EI coil and its geometric relation to a patch of metal in a GPR antenna.

FIG. 1 shows a most general configuration for an EI coil loop 010 carrying a current 011 and a patch 020 of the conductor of an antenna. For such an arrangement, the magnetic field from the coil is substantially parallel to the Z axis 015, although there is a divergence of the field outward from the Z axis. Therefore a patch antenna 020 parallel to the Z axis 015 located at the center 012 of the coil will have no crossing of field lines perpendicular to its surface, whereas if the patch antenna 020 is moved further from the center of the coil towards the middle as shown in FIG. 1, then there will be some cutting of field lines through the patch but it will be significantly less than if the patch antenna conductor 020 were turned perpendicular the magnetic field lines. In that latter case, copious eddy currents would be formed which as discussed subsequently are deleterious to EI coil performance.

Figure 2:
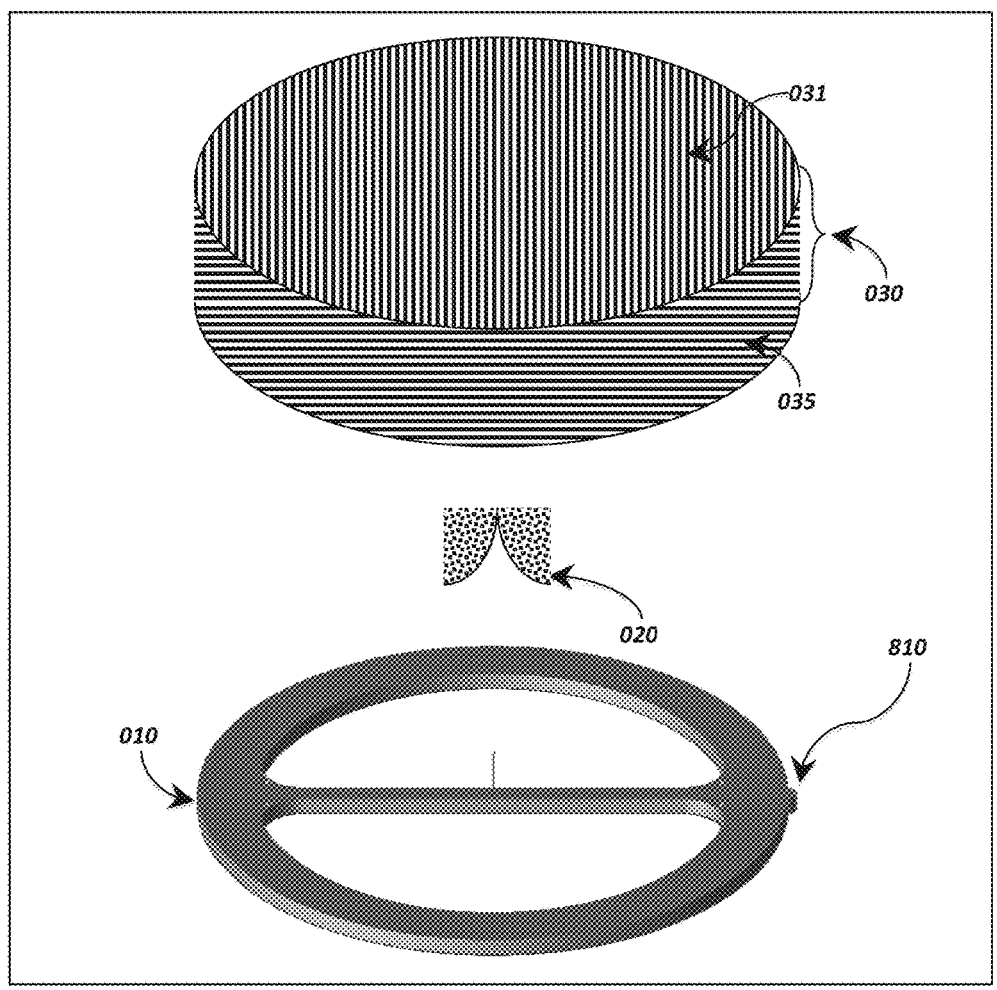
FIG. 2 shows the three main subsystems of the invention, the EI coil, the GPR antenna element and the shield for the GPR antenna.

Given the observations made for FIG. 1, the general approach to the current invention is illustrated in FIG. 2. Shown is a notional EI coil 010, a notional conductive planar antenna element 020 (potentially a Vivaldi type antenna element) that is parallel to the aforementioned magnetic fields in the coil and close to and ideally centered on the Z axis of the coil and its magnetic field. A semi-conductive shield assembly 030 comprised of a top panel 031 and a side wall panel 035 is provided, the combination of which is added over the antenna element 020 and atop and nominally flush to the top of the coil 010. The coil may be a single mono-coil design or any of more sophisticated designs such as the "figure-8" coil shown, also referred to as a Differential Coil.

The purpose of the semi-conductive shield 030 is to reject outside RF interference for the RF antenna, and also provide a conductive backplane for the antenna elements 020 without degrading sensitivity or dynamic range of the EI coil 010.

The antenna 020 may be constructed of any design which will minimize the coupling to the EI coil 010 and thereby avoid the production of eddy currents which would in turn produce undesired false signal to the EI coil 010. Such false signal limits the dynamic range of the EI coil, reducing its sensitivity, potentially by significant amounts if not mitigated properly by the teachings herein. In general, there will be two ways to mitigate the coupling of the antenna 020 to the EI coil 010. The first way is to minimize the amount of flux that is intersected (cut) by the EI coil's magnetic field lines. The second way is to dampen the induced eddy currents with resistive loading. Combinations of these two means can further reduce the production of eddy currents and improve the dynamic range and sensitivity of the EI coil 010.

The raw amount of flux lines cut by the antenna 020 can be minimized by making the conductive surfaces of the antenna 020 as parallel to the EI coil's magnetic field lines as possible, and minimizing the size and areas of any cross section of any conductors that cut perpendicular to the EI magnetic field lines. Only metal that has a cross section that has EI magnetic field lines through it can potentially induce the eddy currents which the EI coil 010 detects. By minimizing the conductive cross sectional area that cuts EI magnetic field lines, we minimize the production of deleterious antenna based eddy currents.

Figure 3:
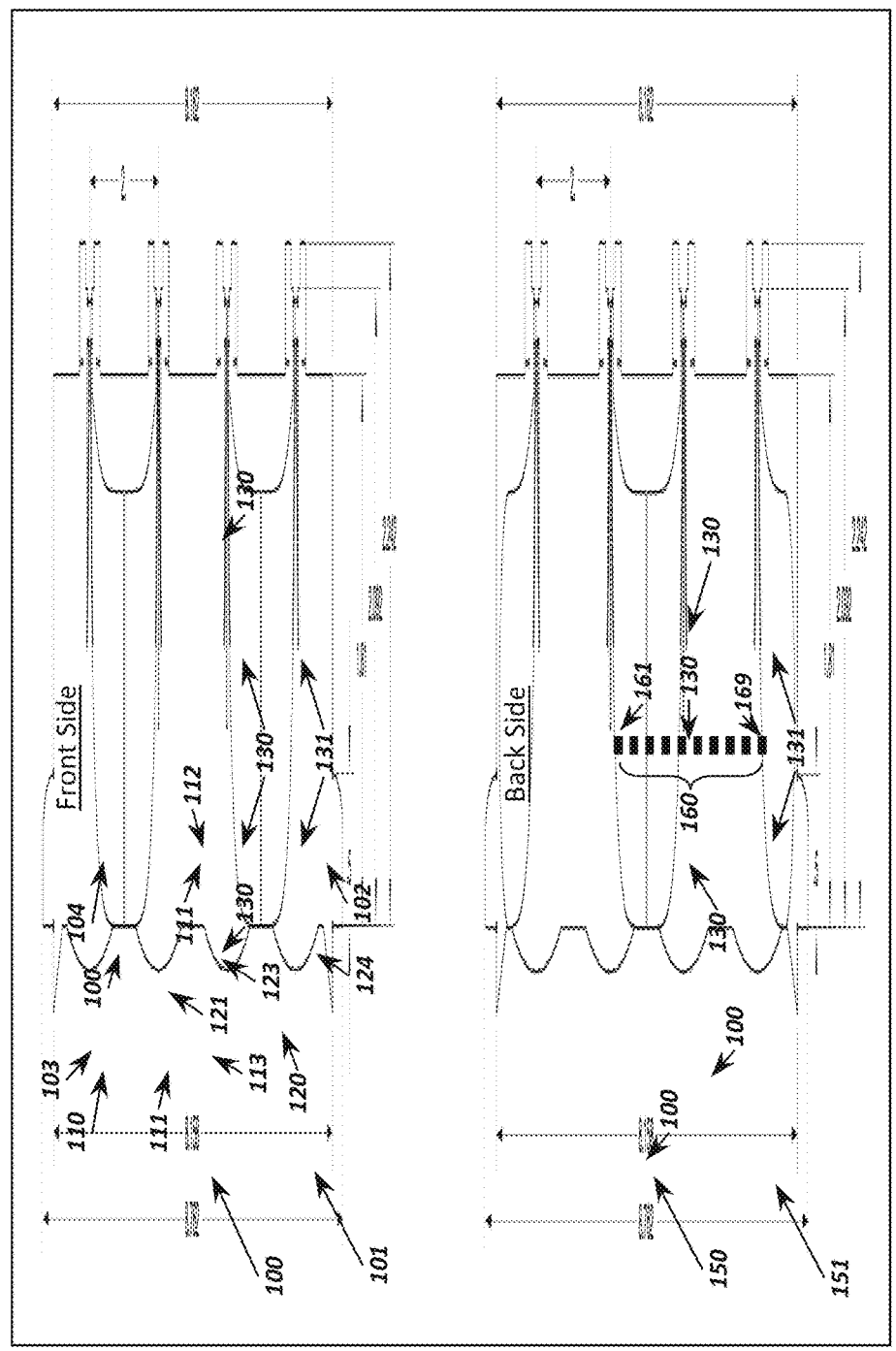
FIG. 3 shows the design and attributes of a UWB GPR connected linear array antenna according to the invention that will manifest minimum degradation onto the performance of the EI sensor.

Various antenna designs can meet the requirements above for antenna 020. Without limiting the scope of the invention, one example of antenna and associated antenna elements 020 demonstrated to work is a linear array of planar Vivaldi or Antipodal Vivaldi antenna such as illustrated in FIG. 3. FIG. 3 shows the outlines and the dimensions of the front side 100 and the back side 150 of a Printed Circuit Board (PCB) 102 onto which is etched four planar antipodal Vivaldi antenna elements 104 delineated by their feed points 110. The PCB 102 may have an EI coil mounting recess 101 to mount and register the EI coil 010 to the bottom of the antenna 020, and this or other points might be alternatively designed to fix and attach the EI coil 010 to the antenna 020. Location 102 is the bottom edge of the PCB 102 the curvature of which is tailored to provide a slightly more uniform beam shape from dielectric loading.

The top of the antenna elements 104 are generally recognized by a perpendicular conductive backplane located at 100, and the bottom at the points 124 which is also the tips of adjacent antipodal Vivalidi slots. Signal is fed to (or received from) a four pin header mechanically registered in the slot at 103, and secured with solder to the feed line traces of 111 and 112. These traces extend only part way down the throat of the antipodal Vivaldi slot and their purpose is to provide sufficient capacitance to the slot to match a feed impedance at 103 of about 100 ohms to provide a good impedance match and minimize reflections. These traces employ vias to the opposite side of the circuit board and to Vivaldi shaped petals to further enhance the capacitive contribution. They also serve to conduct the signal from the correct pin in the feed header stationed at 103 to the correct polarity of petals where a dual polarized intersection is present at 130.

Once the signal has been launched into slot 113, the majority of the current flows down the Vivaldi shaped slot edge 120 towards the apex at 124. However, some of the current also diverges from repulsion of charges down along the edge 121 closer to the conductive backplane at 100. The charges then pile up along edge 123 and either pass through each other (wave action) or reflect from the region near 123 resulting in a Voltage Standing Wave Ratio (VSWR) Return Loss (RL).

Note that the PCB tab at the feed point 110 will pierce through the conductive backplane that rests and is fixed to edge 100 with sufficient clearance to not impede or affect the free flow of signal from the slot 113 through the feed point 110 to the header pins at 103.

Although a gap 130 may be left between the antipodal Vivaldi slotted antenna elements, this will limit the low frequency performance of the antenna. Instead, we prefer to construct a connected linear array of these antipodal Vivaldi slotted antenna elements which allows the currents to flow across the entire array aperture, and this substantially enhances the low frequency response of the antenna. This may be done by simply bridging over slot 130 with conductive cladding, or conductive tape, or similar conductive means. However, when this is done, a problem is encountered wherein the current flowing on edge 121 now has free continuity to the adjacent feed point at 104. We desired such continuity to support the connectedness of the connected array. However, the path 121 passes too close to the conductive backplane 100, which then effectively reduces the impedance from this current, and decreases the impedance as the frequency is lowered. Effectively then the path 121 to 104 acts like a shunt that shorts the antenna out at low frequencies, while at high frequencies the signal is held in the slot 113 for efficient radiation.

The problem with the above situation is that the current flowing on edge 121 effectively bypasses the desired current path on the outer edges 120 and 124. The preferred path of 120 through 124 to 104 keeps the current far away from the conductive backplane at 100, allowing the impedance to be well matched to the feed and supporting efficient radiation. But if we are to have a connected array for enhanced low frequency operation, we somehow must also short the gap 130 which then also permits the current on edge 121 to shunt to feed point 104, increasing return loss at lowest frequencies.

The solution to this dilemma is to bridge the gap 130 with resistors 160. However these resistors must be selected correctly to provide the desired result. If the resistors are very high valued, even though they are in parallel, the net value may be so high as to open the slot circuit, meaning there is no advantage versus just an open slot without resistors. If the resistor values are chosen too low, then they will make the slot look like its shorted and we are back to the prior dilemma. At either extreme some of the currents may be terminated by the resistance provided, thereby improving return loss by some relatively small degree.

A solution is found by tapering values of resistors 160 from high values at 161 to very low values of resistance at resistor 169. Actually resistor 169 is a dead short. The number of resistors should be large enough to prevent frequency banding but also as small as possible so the resistors do not overly lower the net resistance across the gap too low for the lowest frequencies. Empirically about 10 resistors comprising a linear taper of resistance values ranging from a high value of about 1100 ohms at position 161 to zero ohms at 169 appears to work well.

What this taper does is spatially distribute the current according to frequency. High frequency signals from the feed point 110 will be captured in the slot 113 and will therefore travel the outer perimeter 120 and 124 to 104, efficiently radiating most, if not all, of the energy at high frequencies. Low frequency currents will attempt to take the aforementioned shortcut through the edge 121 to the adjacent feed point 104. However, now they will encounter high valued resistors 161. Because of the high resistance the current will have to work its way up the slot 130 to the apex 124, at which point the resistors 169 are now low value (or even a short at 124) and then the currents can bridge across the neighbor element with controlled emission of lower frequency radiation, thereby enabling the advantages of the connected array. In this process, some energy will be dissipated in the resistors, and this too will serve to enhance the VSWR and RL. The net benefit of the tapered resistors bridging the gap between the antipodal slots is an extension of bandwidth of 10% to 30% towards lower frequencies.

Assuming the planar antenna of FIG. 3 is oriented parallel to the magnetic field lines of the EI coil, the eddy current coupling will be minimized. However this does not necessarily mean that the coupling will be zero, because any practical magnetic field has divergence, meaning it cannot be parallel to the antenna conductors at all points without great difficulty in the design of either the coil, the antenna conductors, or both. But this may be adequate depending on the application requirements. However, if further suppression of eddy currents is required, this may be achieved by the use of resistive cladding such as OmegaPly™. Different values of ohmic resistance per square can be obtained to tailor the ohms to the application. It is found that employing a restive cladding or resistive film with about 4-15 ohms per square for the conductive elements of the antenna will damp the induced eddy currents enough to make the antenna virtually undetectable to the EI coil, even with the antenna in the closest of proximity to the EI coil.

The linear array of antipodal Vivaldi elements shown in FIG. 1 can be used for a single polarization GPR antenna. However there are notable potential advantages for having dual polarized capability. To get dual polarized capability one must have a second linear array of substantially the same type of antenna elements oriented at 90 degrees to the first, and yet still parallel to the Z axis to minimize the coil induced Eddy current coupling. To facilitate the dual polarized feature, the PCB 100 is imbued with a slot 130 of width just slightly wider than the thickness of the PCB with cladding, and projecting downward from the top edge of the PCB about half way across the height of the PCB. This slot intrudes about half way into the PCB as shown in FIG. 3. Then, one makes another similar PCB but with a slot 131 protruding upwards from the bottom edge of the PCB to the substantially same half way point. Thereby, each of these two similar but different PCBs may be mated with their grooves to produce a self supporting Egg Crate type structure as shown in FIG. 4.

Given the two types of slots 130 and 131, one may designate one slot (130) a male slot and associate a polarization orientation to it, such as Horizontal Polarization, with a corresponding linear array 410 for which the illustrated array has two such parallel linear arrays. The other slot (131), a female slot, has an orthogonal orientation to slot 130 and is designated as Vertical Polarization with a corresponding linear array 420 orthogonal to array 410 and for which the illustrated array also has two such parallel linear arrays 420. The assembly of arrays 410 and 420 into an egg crate structure then self supports a dual polarized assembly for dual polarized GPR. The array elements are fed either from a single polarized feed point 430 on the outer edges of the now two dimensional array, while at the location where the PCBs cross there is a dual polarized feed 440. Each of these requires suitable polarity applied to ensure that connected array voltage along each polarization from all the elements in the linear array is applied along each linear array. This requires the feed network to perform the necessary routing and polarity flipping to provide the proper operation. Vertically extending tabs along the upper edges of the egg crate structure serve to fit into appropriate slots of a feed network during assembly.

Figure 4:
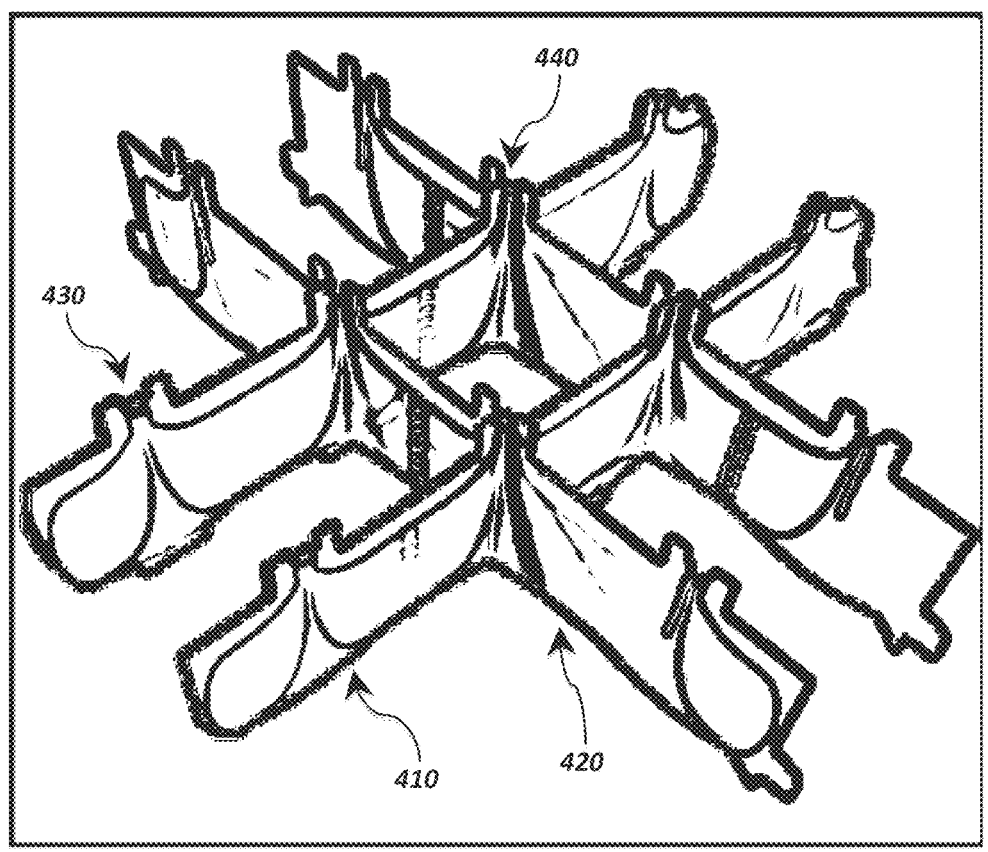
FIG. 4 shows a dual polarized arrangement of the UWB GPR connected linear array antenna.
Figure 5:
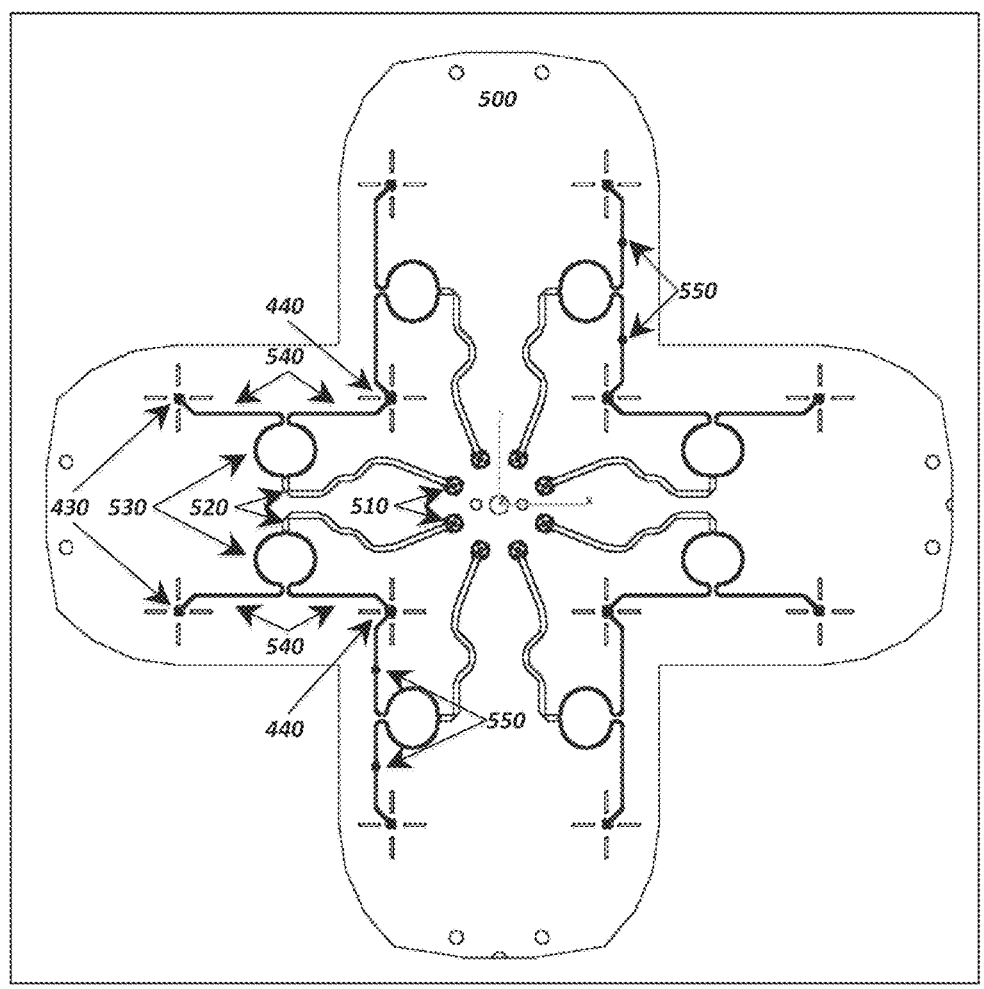
FIG. 5 is the feed network PCB board for the UWB GPR connected linear array antenna.

FIG. 5 shows the feed network for the egg crate arrangement of dual polarized antipodal Vivaldi linear arrays as shown in FIG. 4. The feed network is created from a thin PCB substrate 500 into which mounting and alignment slots are cut as shown for the vertically extending tabs shown in FIG. 4, such as near the locations 430 and 440 to pass through and be fixed by glue or solder. In this manner the feed network PCB helps to hold the assembly together (along with the top shield PCB which will be described subsequently). Header pins soldered to the Vivaldi element feeds at 103 (FIG. 3) pass through via holes at the feet points 430 and 440 on feed network PCB 500, and are soldered into those vias to create the connectivity between the feed network and the linear array PCB antenna elements.

RF connectivity is initiated at SMP bulkhead jacks 510 (FIG. 5) centrally mounted onto PCB 500. In this design there are 8 such SMP jacks. Note that these jacks can induce eddy currents in the EI coil. To suppress the effect, the SMP jacks are chosen because they are small to minimize eddy current production. Also they are selected to be of nickel alloy which provides some resistance to dampen the eddy currents. Next they are arranged in a completely symmetric circular pattern about the center of the coil. Note that since the coil employed here is a differential coil, the emissions from the eddy currents exactly cancel in the differential coil. In this manner, the coupling from these metallic components is almost completely eliminated.

The RF signal runs from the SMP jacks at 510 into a differential twin strip transmission line 520, one microstrip on each side of the PCB 500. The line can be made unbalanced and thereby provide a balun feature going from 510 to the feed points 430 or 440. However, the twin strip lines already provide balun behavior just with distance so this is not really required as long as the impedance is well matched from the SMP jacks 510 to the transmission lines 520.

From 520 the signal is connected to Wilkinson Dividers 530 which split the signal into two lines 540 which then feed points 430 and 440. There is an isolation resistor between the lines 540 where the Wilkinson Divider ends on both sides of the PCB 500. Typically the arrangement would be to go from the a 50 ohm SMP connector at 510 to two 100 ohm differential lines 540 that have an impedance taper that takes them down to about 75 ohms at 430 and 440 which (depending on the specifics of the antenna elements) appears to be the average of the feed point impedance for the antenna elements in the array.

Note that in addition to the SMP connectors being minimally coupled to eddy currents and totally balanced, likewise the entire feed network has extremely low coupling to the differential EI coil. The traces of the transmission lines are very narrow so they cannot support significant Eddy currents. Further, they form no closed loops which could cause eddy currents. Also, they are completely symmetrical about the differential EI coil, so they will be all but invisible to the EI sensor.

Figure 6:
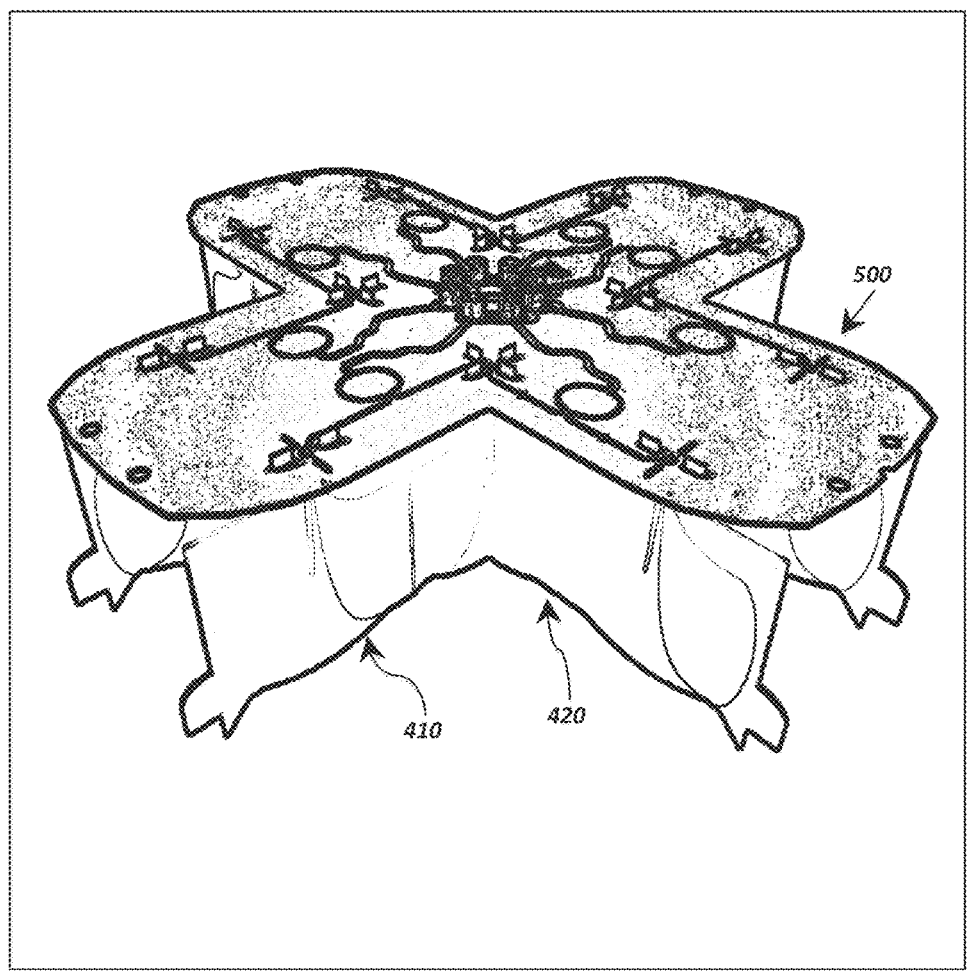
FIG. 6 shows the feed network PCB board mounted to the UWB GPR connected linear array antenna.
Figure 7:
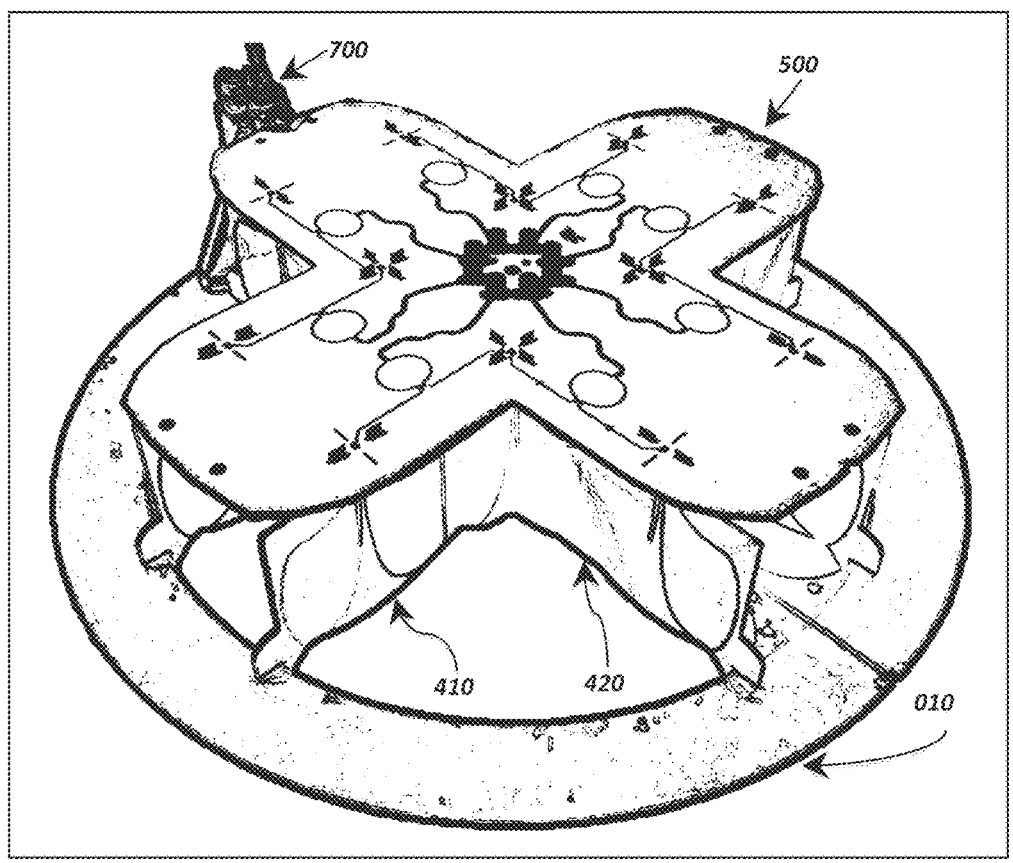
FIG. 7 shows the feed network PCB board mounted to the UWB GPR connected linear array antenna further mounted atop a differential EI coil.

FIG. 6 shows an angled view of the assembly at this point. This assembly is now mounted onto the differential EI coil 010 as shown in FIG. 7 The Vertical Polarization linear arrays 420 straddle the septum of the differential EI coil, and the coil output harness 700 emerges from the back end of the assembly.

To this point we have described the construction of the active RF antenna element components, but to have a viable antenna one also needs to shield it from interference and environmental noise. This presents a problem for integration with an EI sensor coil since shields are often made of metal, and we wish to minimize metal to prevent it from reducing the performance of the EI coil. In this regard, there are two types of shields: absorptive shields and reflective shields. Absorptive shields require depth and often will be heavy, both of these aspects we wish to avoid for a hand held mine detector. A reflective shield is often most effective, but it suffers incompatibility with EI sensors because of the production of large eddy currents.

Figure 8:
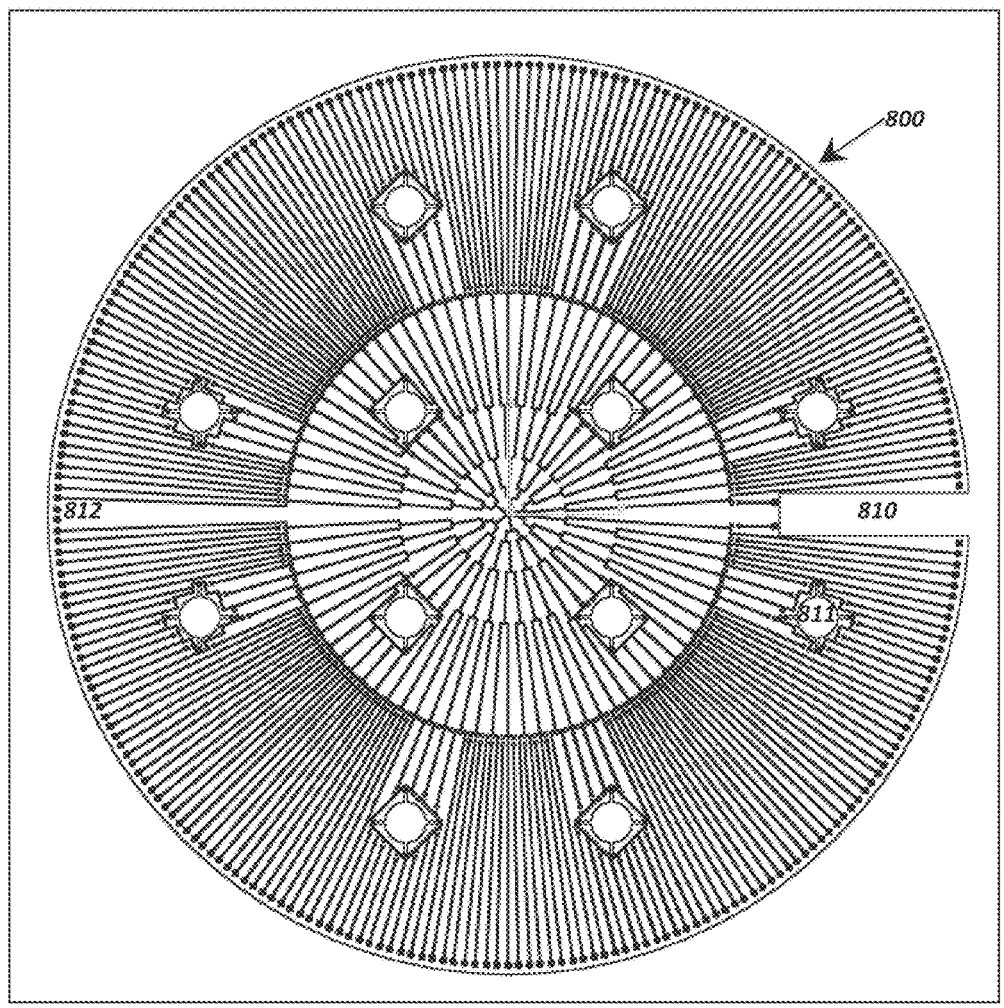
FIG. 8 shows the inter-digital radial traces of the top shield of the UWB GPR array antenna designed to minimally degrade the EI sensor.

To address this issue the current invention takes a combined approach, using a reasonable amount of absorption in a balanced manner, and also employing a unique reflective shield design which theoretically can have almost no EI coupling from Eddy currents. FIG. 8 illustrates the concept where thin radial traces 900 are etched onto a non conductive PCB substrate 800. Because the radial traces cannot close a loop, they cannot support eddy currents. However, because their length is sizable compared to a wavelength at the RF frequency of the UWB GPR radar, they do offer some reflection of incident interference, and similarly can act as a backplane for the UWB array. Notch 810 is an indentation for the EI coil harness to pass through and an amplifier circuit to be located at. Holes 811 are each provided with four notches to receive the vertically extending tabs 430 and of 440. The opposite side of the top shield from the EI wire harness is identified at 812.

Figure 9:
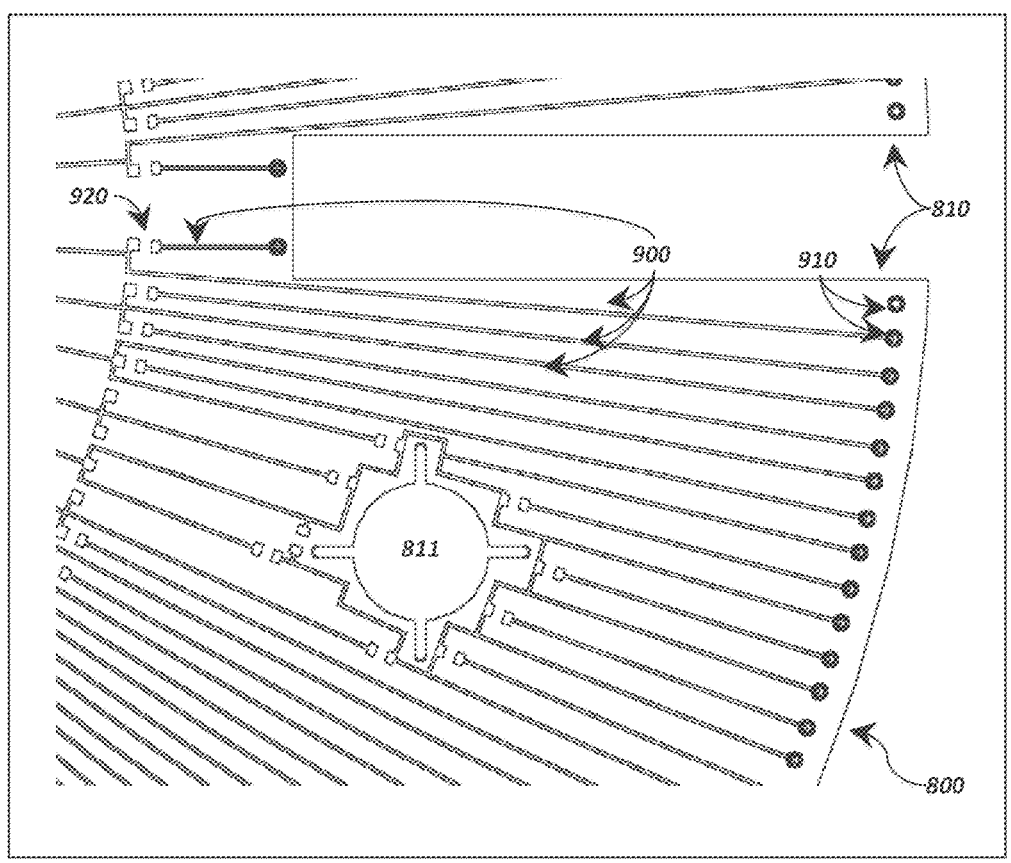
FIG. 9 shows a close up of the inter-digital radial traces of the top shield of the UWB GPR array antenna designed to minimally degrade the EI sensor.

FIG. 9 shows a partial closeup view of the traces 900. Also shown are pads 920 which can accommodate either resistors or shorts by soldering to maximize the performance of the shield in the bands desired. The hole 811 for passing the aforementioned feed point tabs at 430 and 440 is also shown, as well as how the traces are routed around the holes in a careful manner to avoid the creation of a circuit loop that could support eddie currents. Resistor pads are also present to help isolate the currents between traces and both reduce UWB interference while also minimizing the eddie currents. Also shown are pass through vias 910 for connecting the top shield 800 (also 31 in FIG. 2) to the side shield 35, (also 1110, 1120 and 1130 in FIG. 11).

Figure 10:
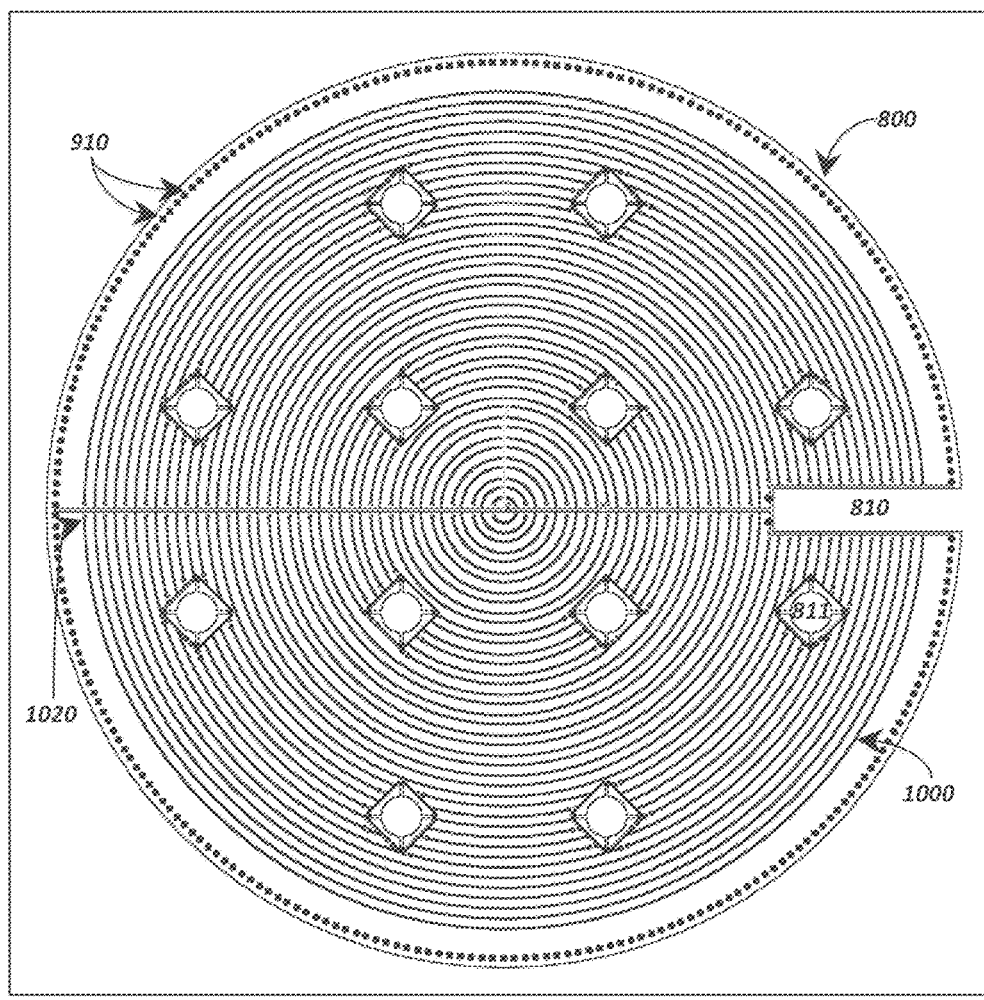
FIG. 10 shows the inter-digital azimuthal traces of the top shield of the UWB GPR array antenna designed to minimally degrade the EI sensor.

FIG. 10 shows the opposite side of the top shield PCB 31. It has traces 1000 that run perpendicular to the radial traces of the first side. The same circuit rules apply for preventing eddy currents from forming, so in this case the arc traces are interlaced, every other arc of a different radius terminating with resistors onto a central spine trace between 1020 and 810. In this way no eddy currents can be supported, but fields parallel to the traces can be reflected and/or terminated in the resistors at 1020.

Figure 11:
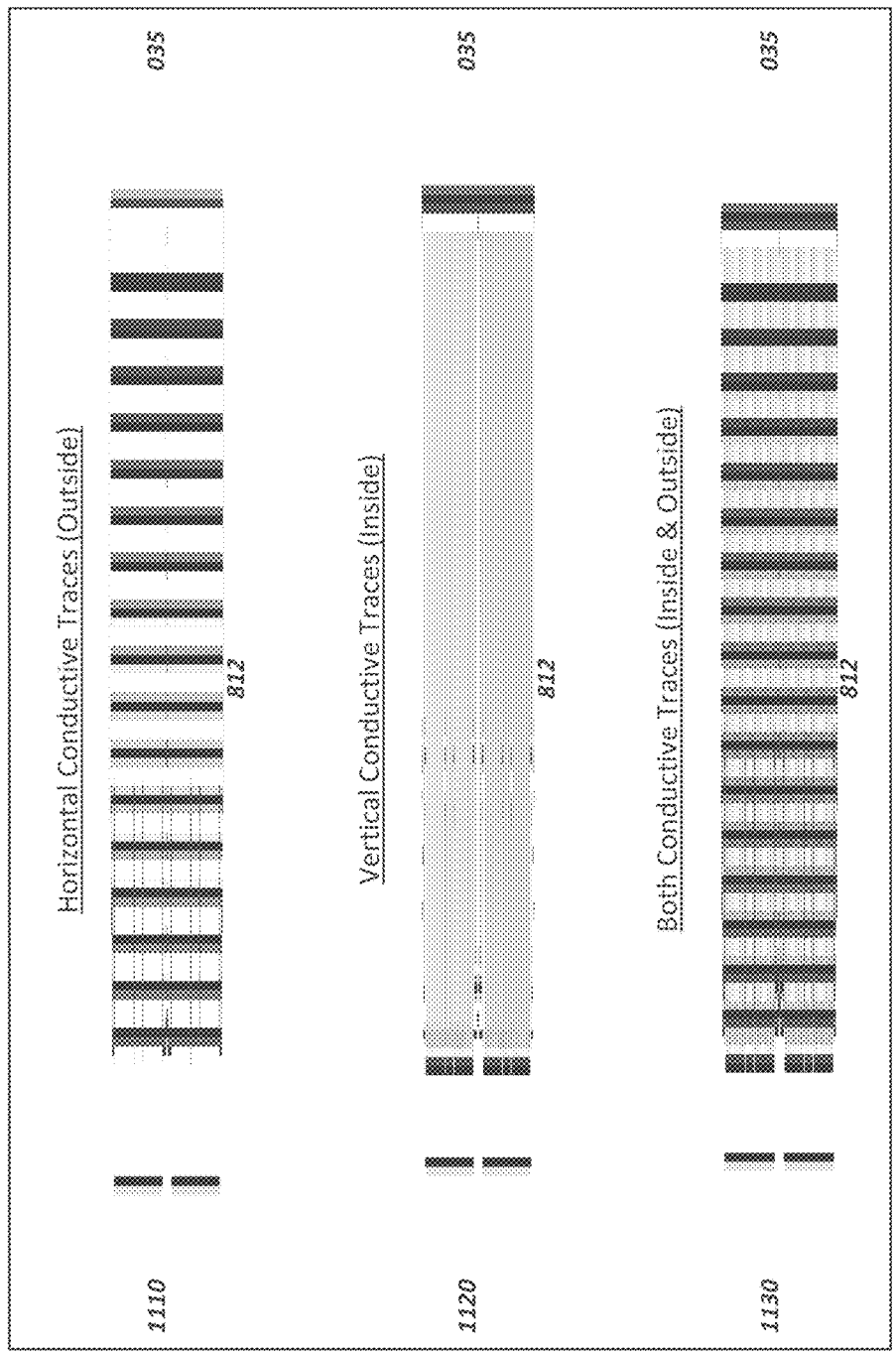
FIG. 11 shows the inter-digital horizontal and vertical traces of the side shield of the UWB GPR array antenna designed to minimally degrade the EI sensor.

FIG. 11 shows a similar design for the side shield wall 35. There are horizontal traces on one side 1110 of the PCB and vertical traces on the other side 1120 of the same side wall PCB. This then forms a cross patch of traces in both polarizations 1130 if one were to look with x-ray vision through the PCB.

Figure 12:
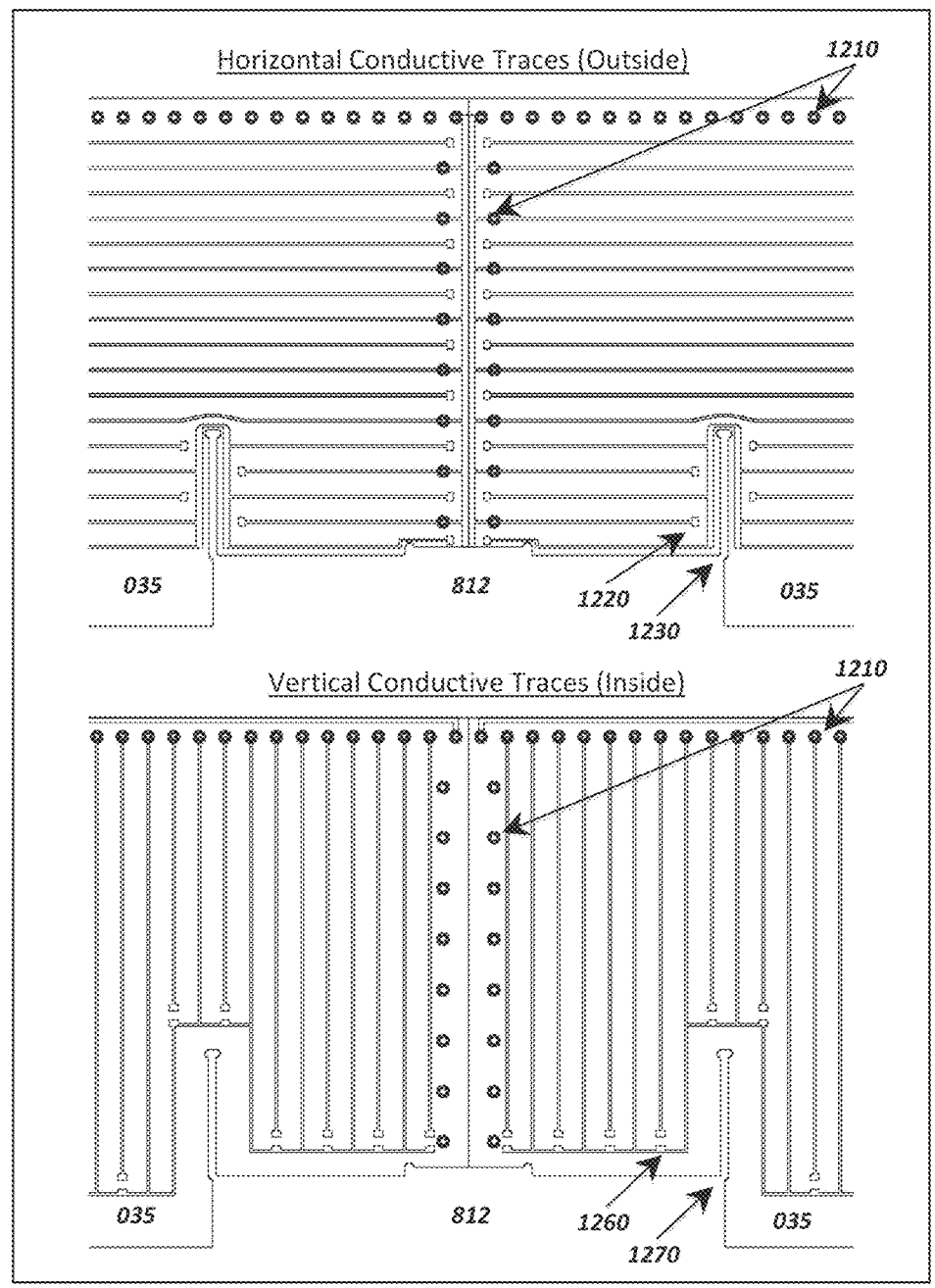
FIG. 12 shows a close-up of the inter-digital horizontal and vertical traces of the side shield of the UWB GPR array antenna designed to minimally degrade the EI sensor.

A closeup of the region 812 of the side wall shield where the horizontal traces meet is shown in FIG. 12. Pads for termination resistors are at 1220 and 1260 for the horizontal and vertical traces respectively. Slots are cut in the PCB at 1230 and 1270 to admit, register and secure the mounting tabs near 101 (FIG. 3) from the antenna linear array PCBs 100. Pass through vias 1210 connect to corresponding right angle header pins to connect the top of the side wall shield at each via 1210 to the vias 910 of the top shield 800. Note that the traces on both sides of side shield 35 also employ the interlaced design that prevents any loops from forming that could create eddy currents, and also provide similar resistors for terminating currents of both the EI and RF kind.

Note that the traces of both 31 and 35 could alternatively be made from a resistive film such as OhmegaPly™ to incorporate the resistive feature directly and eliminate the myriad of resistors. The resistor pads provide a means for trying different restive values out and then that restive value can be imbued in the OhmegaPly design. Note also the solid sheet OhmegaPly™ might also be used and if so a value of about between 4-15 ohms per square appears to optimally suppress eddy currents, while providing shielding. A best design though will implement the interlaced traces approach with a resistive film as this will provide the best attributes of both.

Figure 13:
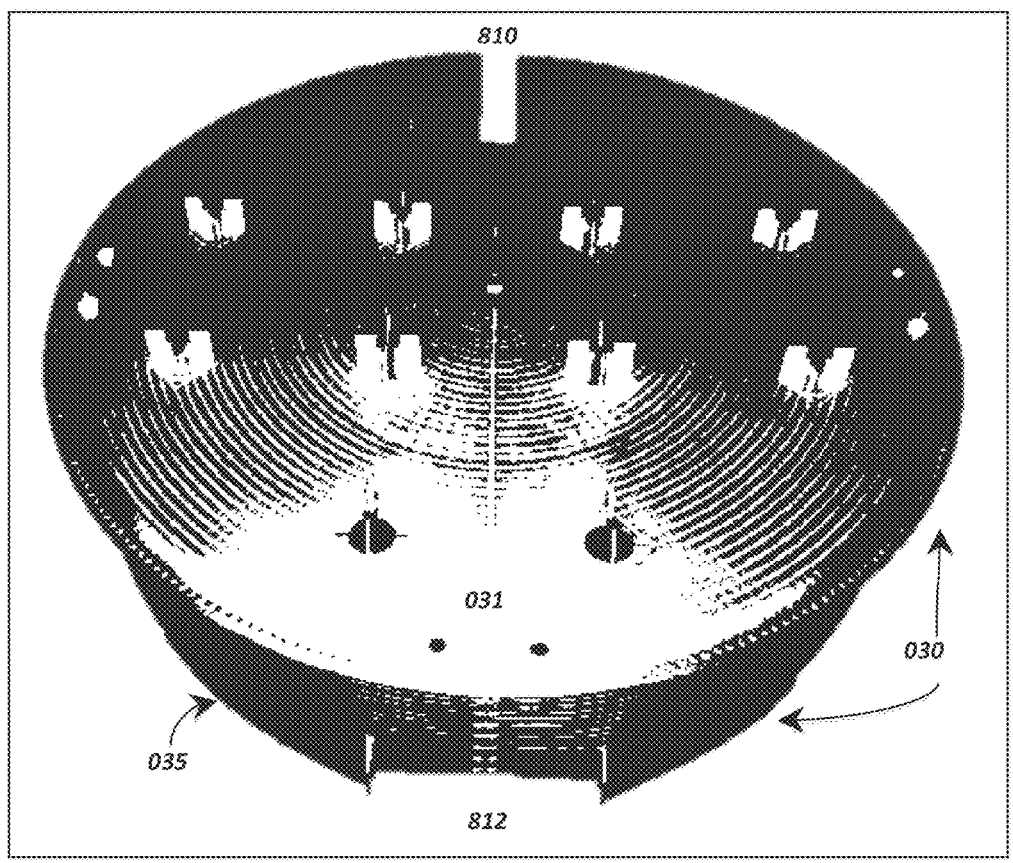
FIG. 13 shows the assembled inter-digital shield.
Figure 14:
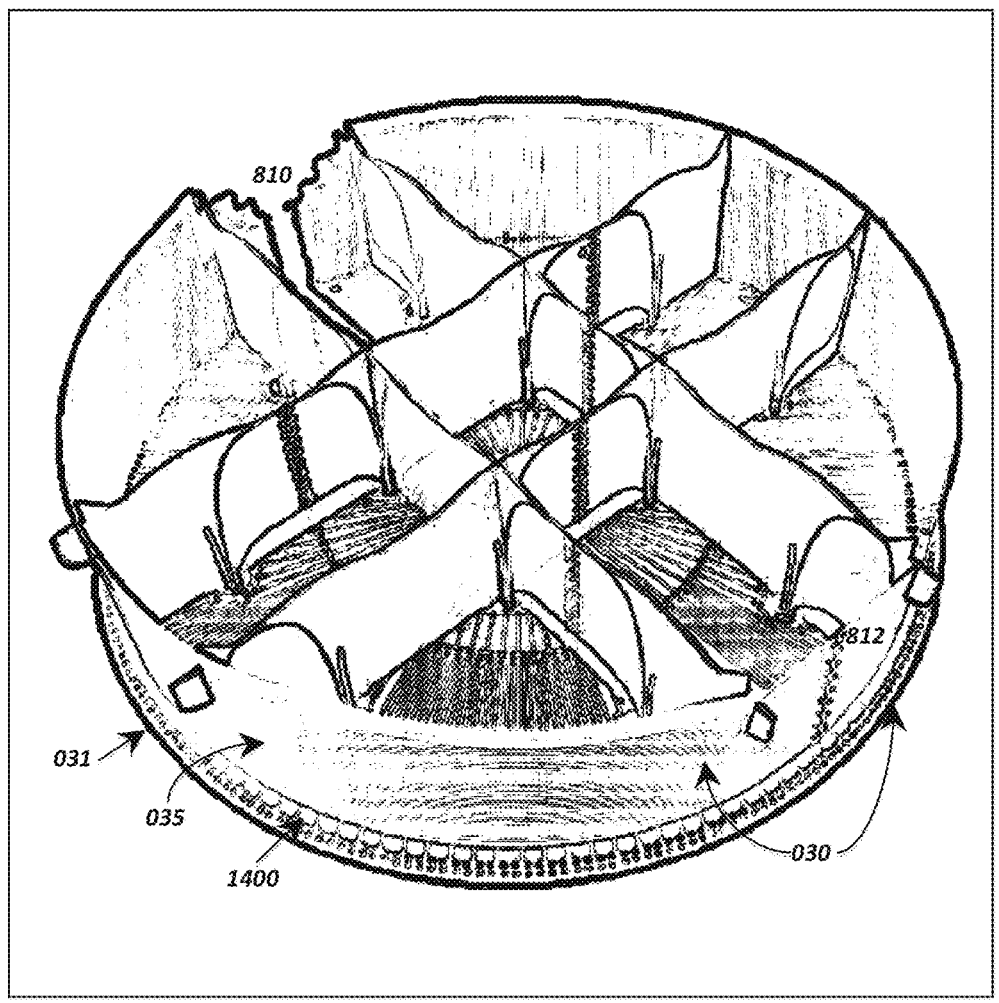
FIG. 14 shows the use of right angle headers for assembling the inter-digital shield.

With the shield top and shield sides now defined, they are assembled as shown in FIG. 13 to create a flat "Top hat" shield to go over and enclose sides of the array of PCBs and the EL coil. The previously mentioned right angle header pins, designated 1400 in FIG. 14, are soldered to the pass through vias 1210 (FIG. 12) in each PCB to electrically and mechanically connect the top shield to the side shield. In this embodiment the side shield is wrapped about a cylindrical mandrel during assembly to aid in joining the two shields together.

Figure 15:
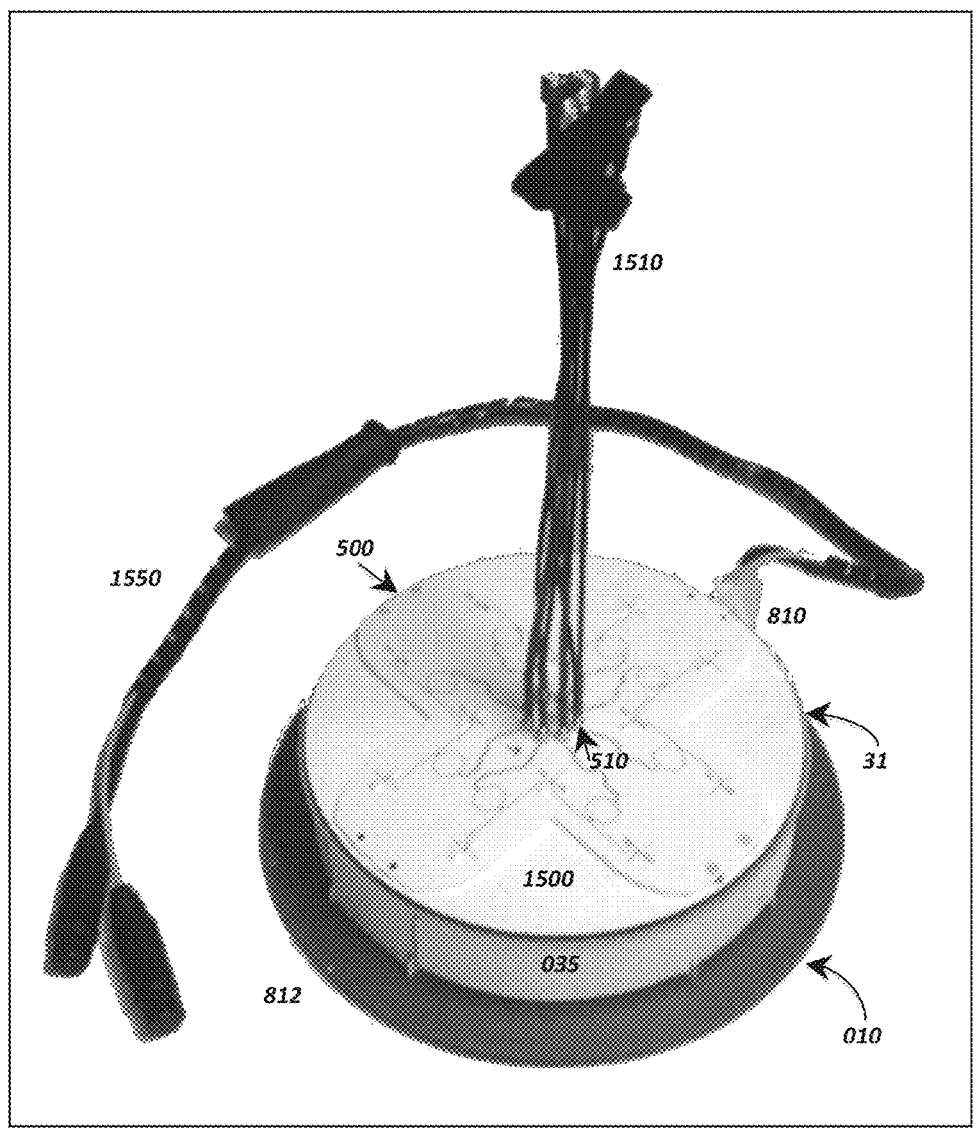
FIG. 15 shows the fully assembled dual phenomenology (EI and UWB GPR) mine and IED detection sensor head prototype suitable for a hand held or small vehicle application.

In actual construction, the "top hat" shield is placed over the egg crate arranged PCBs of FIG. 4 before the feed network PCB 500 is applied. The top shield is glued or otherwise secured to the tabs of the linear array PCBs 100 at pass through holes 811. A layer of absorber material such as Eccosorb™ QR-13 carbon loaded foam is applied atop the top shield and then the feed network PCB 500 is added and soldered to the header pins at the feed points. The resulting assembly can then be mounted onto the differential EI coil 010 as shown in FIG. 15. The wire harness 1550 for the coil emerges from the assembly at 810. Into each SMP jack 510, a coax cable is inserted and configured vertically into an axial bundle 1510 along the Z axis of the EI coil. Being parallel to the magnetic field, and being central to the coil and its differential null, the bundle of symmetrical RF cables again presents a minimal opportunity for the formation of eddy currents or their detection by the differential EI coil.

The net result of the invention is the achievement of EI operation in the direct proximity of a UWB antenna with almost no perceptible impact or influence, thereby enabling dynamic range approaching or possibly even exceeding 100 dB.

Having thus disclosed my invention and the manner of its use, it should be apparent to those skilled in the relevant arts that incidental changes may be made thereto that fairly fall within the scope of the following appended claims, wherein We claim:

1. A system for detecting land mines imbedded in a medium comprising:
   a detection head further comprising:
   at least one EMF detection coil configured for providing a magnetic field that penetrates a volume of said medium to be searched and detecting magnetic metals in a land mine embedded in said medium,
   a radar antenna having a first electrically connected array of planar radiating and receiving antenna elements that allow currents to flow across an entire array aperture and
   an electronic system for simultaneously operating said detection coil and said radar antenna, for providing indications indicative of a land mine, wherein:
   said radar antenna is mounted within said at least one EMF detection coil in an orientation so that said planar radiating and receiving antenna elements are parallel to magnetic flux lines developed by said magnetic field, and
   said radar antenna provides signals of a wavelength that penetrates at least said volume of medium to be searched by said magnetic field and detects non-metallic portions of said land mine embedded in said medium.

2. The system of claim 1 wherein said planar radiating and receiving antenna elements are Vivaldi type slot antenna elements.

3. The system of claim 1, wherein said EMF detection coil and said radar antenna emit co-aligned and overlapping sensor detection patterns—with similar sensitivities for objects expected to provide electromagnetic and radar signatures within said volume of medium to be searched.

4. The system of claim 1 wherein said at least one EMF detection coil further comprises a symmetrical differential figure-8 coil with a symmetrical non-differential transmit mono-coil, and a balanced but anti-symmetrical differential pair of receive coils.

5. The system of claim 3 wherein said co-aligned and overlapping sensor detection patterns wherein said radar antenna is oriented coaxially to a polar axis of said symmetrical non-differential transmit mono-coil, and also symmetrical to said balanced but anti-symmetrical differential pair of receive coils.

6. The system of claim 5 wherein conductors of said radar antenna are configured and oriented to minimize cutting of magnetic field lines from said symmetrical non-differential transmit mono-coil to minimize formation of eddy currents.

7. The system of claim 6 wherein said radar antenna is constructed of a resistive material, for dampening any eddy currents developed by said magnetic field lines.

8. The system of claim 2, wherein said Vivaldi-type slot antenna elements are planar antipodal antenna elements.

9. The system of claim 8, wherein said connected array comprises antenna elements configured as Vivaldi-type slot antenna elements in a linear antipodal arrangement.

10. The system of claim 9 wherein said Vivaldi-type slot antenna elements are connected by a tapering of parallel resistances along a boresight direction of said Vivaldi-type slot antenna elements, said parallel resistances being a Wu-King-like resistive taper, with a highest resistance of about 1000 Ohms per square in throats of slots of the Vivaldi-type slot antenna elements and a lowest resistance being a short at ends of petals of the Vivaldi-type slot antenna elements.

11. The system of claim 1, wherein said radar antenna is a dual polarized connected array antenna.

12. The system of claim 9, wherein the radar antenna comprises gaps between each of the antipodal Vivaldi slotted antenna elements and a conductive material bridging over said gaps.

13. The system of claim 12, wherein said conductive material bridging over said gaps comprises resistors.

14. The system of claim 13, wherein said resistors are arranged in parallel and tapered to provide a highest resistance in throats of slots of the Vivaldi-type slot antenna elements and a lowest resistance at ends of petals of the Vivaldi-type slot antenna elements.

15. The system of claim 14, wherein the lowest resistance at the ends of petals of the Vivaldi-type slot antenna elements is a dead short.

16. The system of claim 9, wherein said radar antenna further comprises a second electrically connected array of planar radiating and receiving antenna elements oriented at 90 degrees to the first and parallel magnetic flux lines developed by said magnetic field, wherein said second electrically connected array comprises substantially the same type of antenna elements so that currents flow across the entire array aperture.

17. The system of claim 1, wherein said radar antenna further comprises a second electrically connected array of planar radiating and receiving antenna elements oriented at 90 degrees to the first and parallel magnetic flux lines developed by said magnetic field, wherein said second electrically connected array comprises substantially the same type of antenna elements so that currents flow across the entire array aperture.

\* \* \* \* \*